(12) United States Patent
Feuerbach et al.

(10) Patent No.: US 7,574,267 B2
(45) Date of Patent: Aug. 11, 2009

(54) CONTROLLER FOR A MACHINE-TOOL OR PRODUCTION MACHINE

(75) Inventors: Armin Feuerbach, Weisendorf (DE); Gerhard Heinemann, Erlangen (DE); Henning Höhnert, Erlangen (DE); Eckart Krebber, Erlangen (DE); Karl Luber, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 798 days.

(21) Appl. No.: 11/018,425

(22) Filed: Dec. 21, 2004

(65) Prior Publication Data

US 2005/0137727 A1 Jun. 23, 2005

(30) Foreign Application Priority Data

Dec. 22, 2003 (DE) ................................ 103 60 528
Sep. 17, 2004 (DE) ........................ 10 2004 045 195

(51) Int. Cl.
*G05B 15/00* (2006.01)
*G06F 19/00* (2006.01)

(52) U.S. Cl. .......................................... 700/1; 700/181
(58) Field of Classification Search .................... 700/1, 700/181
See application file for complete search history.

(56) References Cited

U.S. PATENT DOCUMENTS

| | | | | |
|---|---|---|---|---|
| 5,056,001 A * | 10/1991 | Sexton | .......................... | 710/10 |
| 5,229,952 A * | 7/1993 | Galloway et al. | ............ | 700/200 |
| 5,752,008 A * | 5/1998 | Bowling | ........................ | 703/13 |
| 6,249,711 B1 * | 6/2001 | Aart | ............................. | 700/19 |
| 6,272,398 B1 | 8/2001 | Osborne et al. | | |
| 6,308,311 B1 * | 10/2001 | Carmichael et al. | ........... | 716/16 |
| 7,228,185 B2 * | 6/2007 | Patz et al. | ...................... | 700/19 |
| 2003/0061311 A1 * | 3/2003 | Lo | .............................. | 709/220 |
| 2003/0191930 A1 * | 10/2003 | Viljoen et al. | .................. | 713/1 |
| 2005/0132037 A1 * | 6/2005 | Sawa et al. | .................. | 709/223 |
| 2005/0228516 A1 * | 10/2005 | Phillips et al. | ................ | 700/87 |
| 2006/0004479 A1 * | 1/2006 | Oyama et al. | ............... | 700/181 |
| 2006/0212132 A1 * | 9/2006 | Vothknecht et al. | ............ | 700/1 |

FOREIGN PATENT DOCUMENTS

| | | | |
|---|---|---|---|
| DE | 196 14 131 | A1 | 10/1997 |
| EP | 0 207 998 | A | 1/1987 |
| EP | 0 813 131 | A | 12/1997 |
| EP | 1 260 887 | A | 11/2002 |
| EP | 1 308 807 | A | 5/2003 |

OTHER PUBLICATIONS

Cuber, U.: "Linux Scripting", Francis Verlag, Poing, 2001, pp. 3-5, 114, 115, 128, 129, 178, 179, 224, 225, 236, 237, 258, 259, 308 and 309.

* cited by examiner

*Primary Examiner*—Ronald D Hartman, Jr.
(74) *Attorney, Agent, or Firm*—Henry M. Feiereisen; Ursula B. Day

(57) ABSTRACT

A controller for a machine tool or production machine includes a computer with a software program that is not executable in real-time, an interpreter implemented in the non-real-time software program, and a storage medium storing an executable macro loadable into the interpreter for execution by the interpreter. The interpreter determines parameters for parameterizing the controller and stores the parameters in a memory area of the computer. A method for parameterizing a controller or a closed-loop controller is also described. The controller and method can be used to parameterize a controller of a machine tool or production machine. A macro can be used to during startup or reset of the controller.

16 Claims, 3 Drawing Sheets

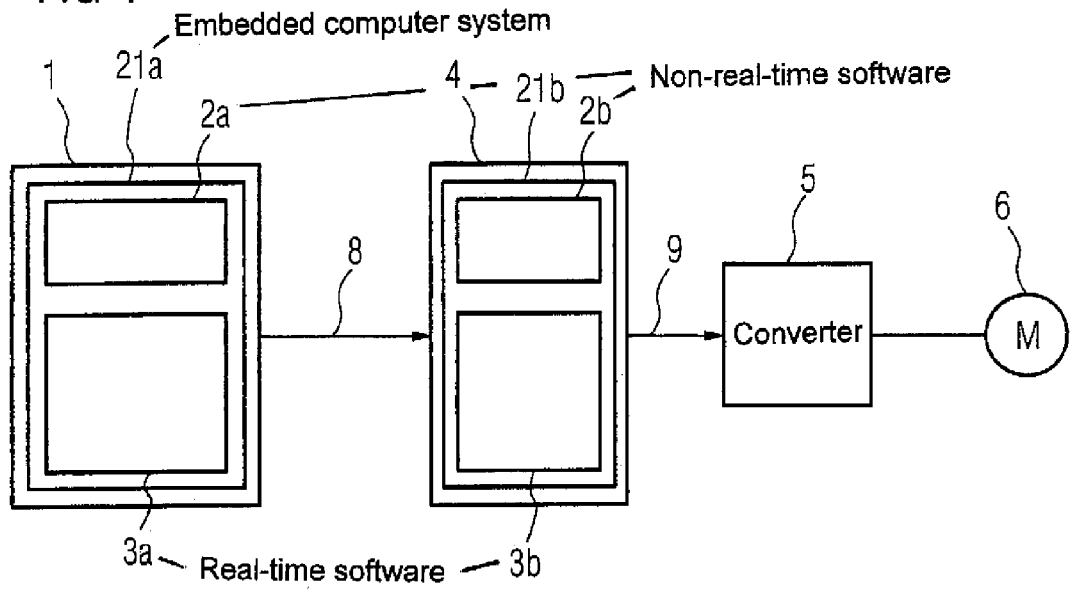
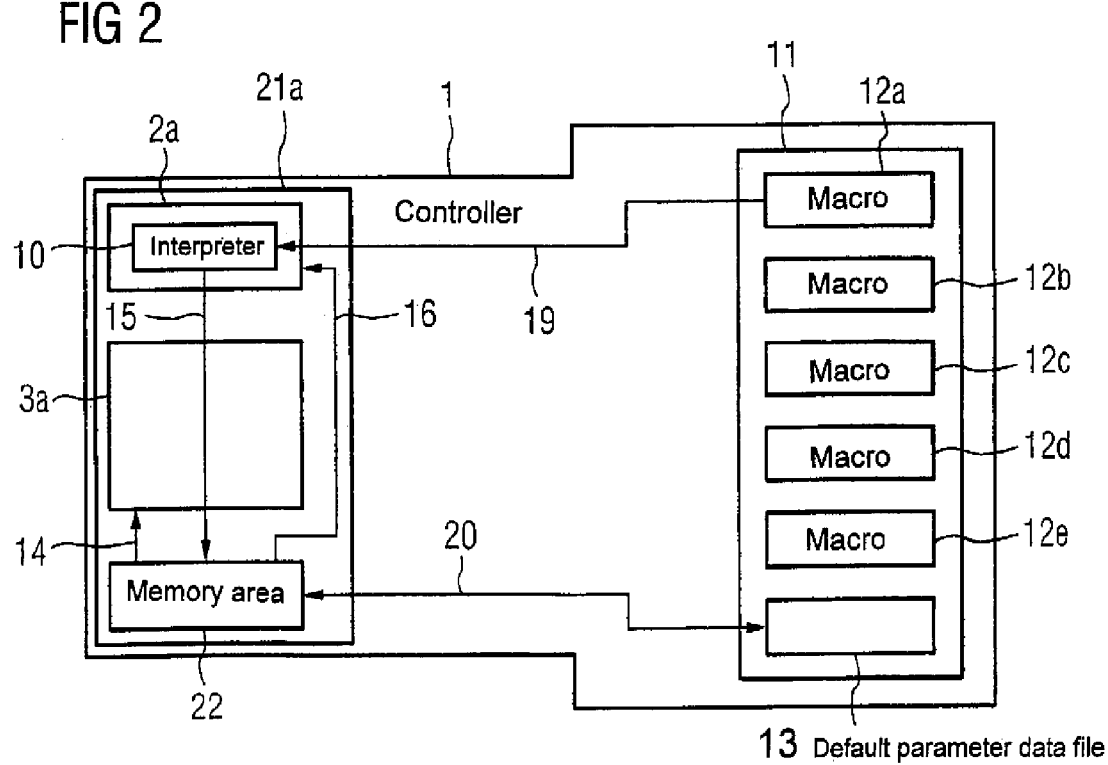

CONTROLLER FOR A MACHINE-TOOL OR PRODUCTION MACHINE

CROSS-REFERENCES TO RELATED APPLICATIONS

This application claims the priorities of German Patent Applications, Serial Nos. 103 60 528.2, filed Dec. 22, 2003, and 10 2004 045 195.8, filed Sep. 17, 2004 pursuant to 35 U.S.C. 119(a)-(d).

BACKGROUND OF THE INVENTION

The present invention relates to a controller for a machine-tool or production machine and to a method for parameterizing a controller for a machine-tool or production machine.

FIG. 1 shows schematically in form of a block diagram the drive concept of a prior art machine-tool or production machine. A controller 1 computes desired values for a closed-loop controller 4, which are transmitted to the closed-loop controller 4 via a connection 8. The closed-loop controller 4 controls, for example, the rotation speed of a motor 6 commensurate with the desired values defined by the controller 1. Controlled output variables from the closed-loop controller 4 are supplied as input variables to a converter 5 via a connection 9, with the converter supplying power to the motor 6. The feedback loop for the actual control variables is not shown in FIG. 1 for sake of clarity.

Due to the stringent requirements for real-time performance, the prior art closed-loop controller 4 is typically implemented on the platform of a special embedded computer system 21b, whereas the prior art controller 1 is implemented as an embedded computer system 21a.

Embedded computer systems are commonly used in drive and automation projects and are typically integrated in the device to be automated, but they can also be operated as stand-alone units, i.e., without the peripheral components, such as keyboard, mouse and display, typically required for personal computers. Unlike the software of personal computers, the software of an embedded computer system is not started by the user, but is fixedly installed in the device as part of the firmware and starts automatically when the device is switched on.

The embedded computer system 21a of the controller 1 includes real-time software 3a executing on a real-time operating system and performing the essential control functions of the controller 1. In particular in more complex machines, the controller 1 also includes software 2a that does not operate in real-time (non-real-time software). The non-real-time software 2a is mainly used to implement operating and visualization functions of the machine. Stated differently, the closed-loop controller 4 includes an embedded computer system 21b with real-time software 3b for implementing control functions that are executed on a real-time operating system, as well as non-real-time software 2b that is executed on a non-real-time operating system and is used mainly for implementing operating and visualization functions of the closed-loop controller 4.

Because the controller 1 or the closed-loop controller 4 are to be used as a uniform hardware platform for the different types of machines and applications, the parameterization of prior art controllers used with conventional machines is time-consuming and complex. For example, several converters 5, each having a motor 6, can be connected to the closed-loop controller 3. In addition, different motor types can be used with several closed-loop controllers 4, instead just the one closed-loop controller 4, all of which can be connected to the controller 1. The number of transducers for measuring the actual values can be different for each machine. Because each machine type and each machine configuration has its own parameterization, with the number of parameters and the type of parameters potentially being different depending on the configuration, parameterizing such machines has thus far being very difficult.

As a result, a conventional controller can have a large number of adjustable parameters for parameterizing the controller and for adapting the controller to the respective application. For example, a user must set parameter values for the parameters. The number of parameters represents a main set for all possible settings and includes subsets. However, in actual applications, only a small number of parameters have to be adjusted. A user confronted with the total number of parameters will find the machine to be rather complex and the drive state not easily discernable, so that errors and problems are time-consuming to investigate and to correct.

To facilitate startup of certain standard applications, several sets of preset values, so-called default values, can be selected for the parameterization by way of an adjustment parameter. Disadvantageously, however, the selection may be limited by the selection criteria to a small number of fixedly defined simple applications. Moreover, the selectable default settings are fixed and cannot be dynamically adapted to different configurations of modular machines. The applications that can be selected in the controller must all be provided in an identical form on external tools, such as a startup-program on a PC, which limits the compatibility between the software version of the controller and, for example, a startup program executed on an external tool.

It would therefore be desirable to provide an improved system and method for easily parameterizing a controller of a machine-tool or production machine.

SUMMARY OF THE INVENTION

According to one aspect of the invention, a controller for a machine tool or production machine includes a computer with a software program that is not executable in real-time, an interpreter implemented in the non-real-time software program, and a storage medium storing an executable macro loadable into the interpreter for execution by the interpreter, wherein the interpreter determines parameters for parameterizing the controller and stores the parameters in a memory area of the computer.

According to another aspect of the invention, a controller for a machine tool or production machine includes a computer that can be parameterized, and an executable macro provided for at least one application and capable of executing assignment statements or control statements, or both, wherein the macro can change a software program of the controller. The software program can be, for example, application software, i.e., software intended for a particular application. The software program can also be run-time software that can be used to make application-specific changes in the parameters.

According to another aspect of the invention, a method for parameterizing or programming a controller of a machine tool or production machine includes the steps of loading an executable macro from a storage medium into an interpreter implemented on a computer as a software program that cannot be executed in real-time, determining parameters for parameterizing the controller, and storing the parameters in a memory area of the computer.

According to yet another aspect of the invention, a method for parameterizing or programming a controller of a machine tool or production machine, which includes a parametrizable computer, includes the steps of providing an executable macro for at least one defined application, with the macro executing assignment instructions or control instructions, or both, and the executable macro changing a software program of the controller.

According to an advantageous feature of the method of the invention, the macro can be executed, for example automatically, during start-up and/or reset of the controller. The controller and/or the closed-loop controller can also be configured so the macro can be called up during startup and reset to change the startup and/or reset process. Even if several macros are provided, only one executable macro may have to be preset. The macro can also be used to automate particular parameter sequences and/or can be parameterized and/or reloaded into a controller.

A user can define the process sequence during a first startup or after a reset (original deletion) of the controller without using a special development environment. In this way, the controller can start up automatically, automatically identify connected components, such as transducers, temperature sensors, axles, etc., and then run automatically. For example, the controller and/or closed-loop controller can be automatically configured according to the automatically detected and identified wiring pattern of the system, and the signal connection within the controller and/or closed-loop controller and with peripheral devices can be automatically established by the macro. The signal connections may be protected against accidental and/or intentional changes.

Machine tools in the context of the present invention can also include, for example, uniaxial or multi-axis lathes, milling machines, as well as drilling or grinding machines. Machine tools can further include processing centers, linear and rotary transfer machines, laser machines, rolling machines and/or gear cutters. These machines have in common that the material is machined along several axes. Production machines in the context of the present invention can include textile, paper, plastic, wood, glass, ceramic or stone processing machines, as well as machines used for forming, packaging, printing, conveying, lifting, pumping, transporting. Furthermore, fans, blowers, wind turbines, lifting gear, cranes, robots, production and assembly lines are also included under the term production machines in the context of the present invention.

According to another advantageous feature of the invention, the macro can include control instructions. The macro can also receive control instructions, for example in the form of loops and conditional executions, so that the parameterization can be easily and individually adapted to the actual machine configuration.

According to another advantageous feature of the invention, the macros can be nested, with a macro including an additional macro and/or a macro can call another macro.

Advantageously, the macro can be easily programmed in a high-level language, such as XML, HTML and/or ACX. XML (Extended Markup Language) and HTML (Hypertext Markup Language) are commonly used high-level languages. ACX is a proprietary binary format based on XML.

Advantageously, the macro can be reloaded and/or executed at any point in time, since the user can change the parameterization at any time.

According to another advantageous feature, the macro can prompt a user to enter data, thereby allowing active communication with the user. For example, the macros can be used to display text on a display screen and prompt the user to enter data. For example, the macro can ask the user relevant questions and determine the actual machine configuration based on the answers.

According to yet another advantageous feature of the invention, the computer can include an embedded computer system. Embedded computer systems are frequently used to control machine tools or production machines; however, the use of an interpreter in the context of an embedded computer system has not been reported to date.

The controller or closed-loop controller according to the invention can advantageously be used to control a machine-tool or production machine.

According to another advantageous feature of the controller, the controller and/or the closed-loop controller can form an integrated control system for performing a number of control tasks. A unified execution plane model can also be configured with different types of execution planes with different priority, whereby various user and system planes are provided, ranging from the highest priority to the lowest priority. The user can load technology packets into the engineering and/or run-time system; a data source for description information for system variables and alarms as well as system variables can provide to the engineering system voice commands and/or system variables through a translator; the run-time system can provide the system variables with actual data of the technical process; and a user can enter additional data via a user interface of the engineering system.

According to another advantageous feature, a macro can be implemented to affect at least two controllers, for example through the controllers' software, whereby the controllers can be connected with each other for data transfer. It should be noted that in the context of the present invention, the terms controller and closed-loop controller are used interchangeably.

Advantageously, the macro can also be associated with and executed in an execution plane. If the macro includes different instructions, then each instruction can be associated with a particular execution plane. The macro can advantageously be programmed in a time-optimized manner.

According to another advantageous feature of the invention, the macro can be executed during startup and/or reset of the controller, which can be done automatically. Advantageously, instructions of the macro can be associated with an execution plane during startup and reset, which speeds up the process.

Advantageously, if several macros exist and/or are programmed, then a user can select and/or activate the most suitable macro.

A macro can also be used in an engineering system configured to program application software, whereby the macro is used in the engineering system in a similar manner as in the controller.

Application-specific macros can be generated and/or executed in an engineering system for programming software that can run on a controller. In particular, the executable macro can include association instructions and/or query instructions and/or control instructions. Query instructions are, for example, queries of system states; for example, one command involves waiting to transmit an instruction until a defined system state has been reached. The macro can be used to at least change software of the controller, in particular application software. A macro can also change parameters and parameter values. Advantageously, changes can not only be made in the application software, but also, for example, in the firmware.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 shows schematically a drive control of a machine-tool or production machine;

FIG. 2 shows a controller according to the present invention;

DETAILED DESCRIPTION OF PREFERRED EMBODIMENTS

Figure 3:
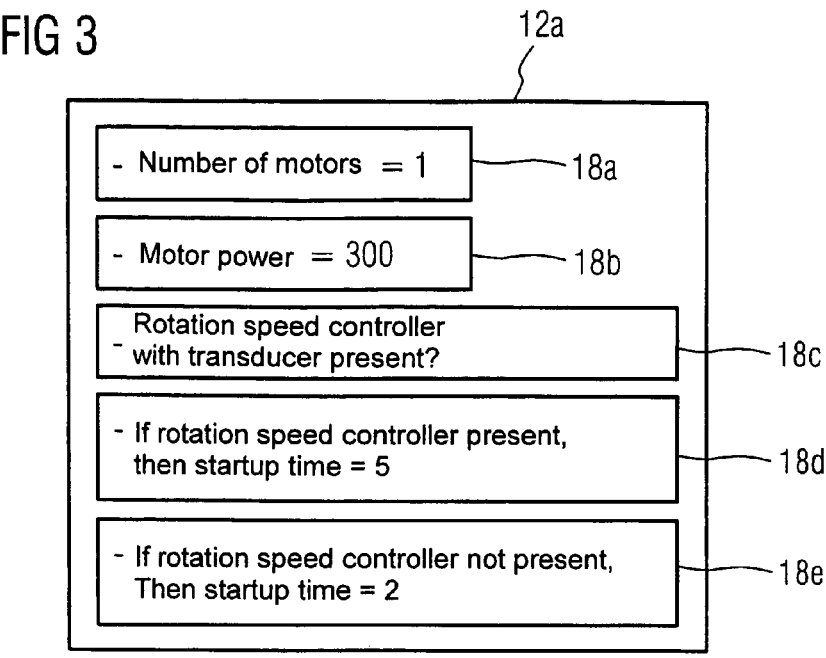
FIG. 3 shows schematically a macro with association instructions and control instructions.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 2, there is shown a block diagram of a controller 1 according to the invention, which includes real-time software 3a with the major control functionalities of the controller 1 which is executed by a real-time operating system. The controller 1 also includes software 2a that is not executed in real-time (non-real-time software) and is mainly used to implement operational and visualization functions of the machine. Visualization functions can also be performed by non-cyclic data exchange.

The controller 1 also includes nonvolatile memory 11, for example implemented as a flash card or a hard drive. As shown in the exemplary embodiments of FIG. 2, five macros 12a, 12b, 12c, 12d, and 12e are stored in memory 11 in form of executable data files, as well as a default parameter data file 13 that provides default parameter values to the controller 1 when the machine is first turned on. The default parameters of the default parameter data file 13 are copied during startup of the controller to a volatile memory area 22 which can be provided, for example, in the form of a random access memory (RAM), as indicated by arrow 20 in FIG. 2. The parameters required by the non-real-time software 2a and by the real-time software 3a are provided to the corresponding software in memory area 22, as indicated by the two arrows 14 and 16. The default parameter values are only used to ensure a reliable startup when the controller 1 is operated for the first time and do not yet include information about the actual machine configuration.

An interpreter is included in the embedded computer system 21a according to the invention as part of the non-real-time software 2a.

For parameterizing the machine, the user of the machine selects a macro, for example script 12a, as indicated in FIG. 2, which is then loaded into the interpreter 10, as indicated by an arrow 19. The executable macro 12a is subsequently executed by the interpreter 10 to determine the parameters for parameterizing the controller. The parameters are stored in memory area 22, overwriting the default parameters. The memory area 22 provides the parameters to the non-real-time software 2a and to the real-time software 3a, as indicated by two arrows 14 and 16. The correct parameters, which are now stored in memory area 22, are then swapped into the nonvolatile memory 11, with the new corrected parameters in the illustrated embodiment overwriting the default parameters of the default parameter data file 13, as indicated by the arrow 20 in FIG. 2. Alternatively, the corrected parameters can also be stored in a separate data file. When the controller 1 is subsequently started up, the correct parameters of the default parameter data file 13 are loaded into the memory area 22, immediately providing to the controller 1 the correct parameters of the actual machine configuration, without requiring a macro or the interpreter 10.

FIG. 3 shows an exemplary structure of macro 12a, which is programmed in a high-level language, for example XML or HTML, which are widely used languages and can be executed, for example, by a conventional interpreter suitable for such high-level languages. A macro includes essentially two types of instructions. In the exemplary embodiment, the macro 12a includes two association instructions 18a, 18b and three control instructions 18c, 18d, 18e. Only five instructions 18a, 18b, 18c, 18d, 18e are shown in FIG. 3 for sake of clarity; however, it will be understood that the macro 12a can include more or less instructions. The association instruction 18a in the depicted embodiment, for example the parameter "Number of Motors", is set to a value of "1". A second association instruction 18b sets the parameter "Motor Power", for example of motor 6 according to FIG. 1, to a value of "300" Watt. Because macros are executable, control instructions, for example in the form of conditional branches, loops, and user queries are also allowed during the parameterization. For example, the control instruction 18c asks if the actual machine configuration includes a rotation speed controller with a transducer.

An instruction, in particular a control instruction, consists of a corresponding executable program code in the high-level language of the macro. For example, the control instruction 18c generates for the user a corresponding input mask on a display, and prompts the user for a response if a rotation speed controller is provided with a transducer. The user inputs the corresponding parameter, for example a "1" if the rotation speed controller is provided with a transducer, and a "0" is the rotation speed controller is provided without a transducer. In the following two control instructions 18d and 18e, the parameter "Startup Time" is set to 5 seconds or 2 seconds by the two conditional branches, depending if a transducer, for example for a rotation speed controller, is present in the actual machine configuration or not.

The parameters determined in this manner are stored, as described above and indicated by arrow 15, in memory area 22. Accordingly, a single macro is capable of parameterizing all parameters of the machine. In general, it is advantageous to store several macros in memory 11 which the user can then select by clicking on a menu. The macros can be adapted to the individual requirements of the corresponding customer and can also be reloaded at any time by a user request. For example, individual parameters that require a change while the machine is operating or during a brief shutdown of the machine, for example, when a new tool is to be attached, can then be easily changed.

The parameters stored in memory area 22 can also be transmitted to the closed-loop controller 4 via the connection 8 shown in FIG. 1, so that the closed-loop controller 4 can be parameterized by the controller 1. The reverse process is also possible.

Figure 4:
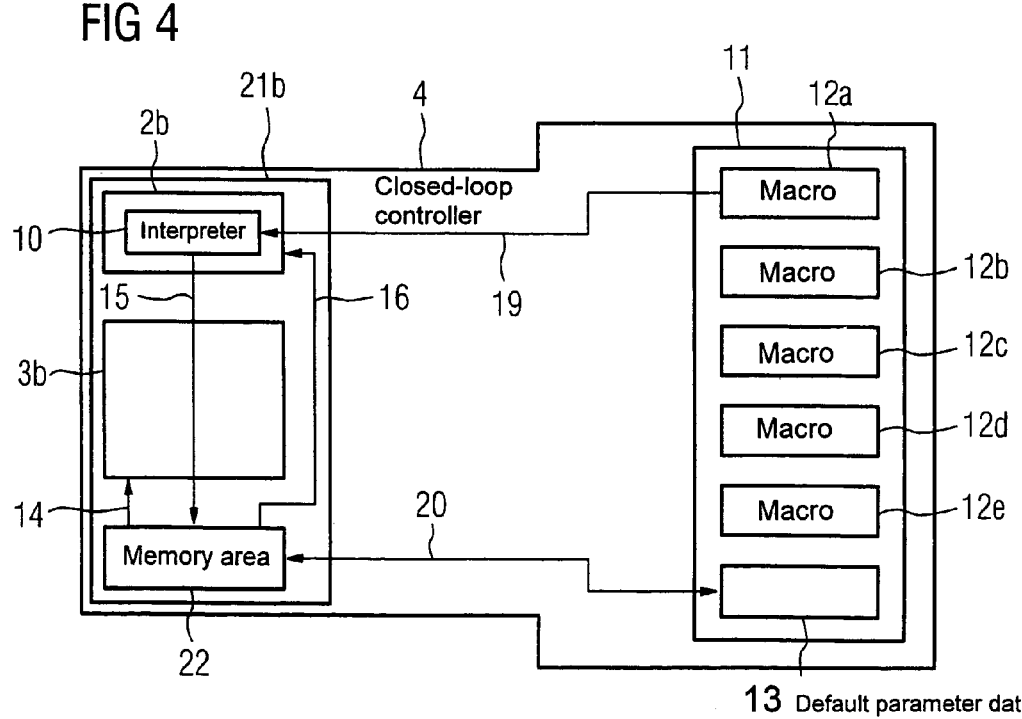
FIG. 4 shows a closed-loop controller according to the present invention.

FIG. 4 shows another embodiment of the invention in the form of the closed-loop controller 4. Several machines, in particular simple machines, such as a fan, typically do not include a dedicated controller 1 of the type shown in FIG. 1. The configuration then corresponds to that of FIG. 1, but without the controller 1. The desired controlled variable, for example the desired rotation speed of the fan, is then directly set in the closed-loop controller 4 of the control system as a fixed desired variable in form of a parameter.

The closed-loop controller according to FIG. 4 is identical to the controller 1 according to FIG. 2, with the exception that a closed-loop controller 4 is used instead of the controller 1. The same reference characters are used and the operation of the closed-loop controller 4, which has been discussed with reference to FIG. 2 above, will therefore not be repeated. In FIG. 4, unlike in FIG. 2, the non-real-time software is labeled with reference character 2b, the real-time software with 3b, and the embedded computer system with 21b. Accordingly, the method of the invention can be used both for parameterizing a controller normal 1 as well as for parameterizing a closed-loop controller 4.

It will be understood that the memory 12 can also be implemented outside the control system according to the invention.

In addition, the macros can also be loaded and interpreted by external devices, such as by a personal computer having an executable startup or operating program.

It will be understood that the invention can also be implemented with conventional computer systems, for example with a personal computer, instead of with the disclosed embedded computer systems 21a and 21b.

Figure 5:
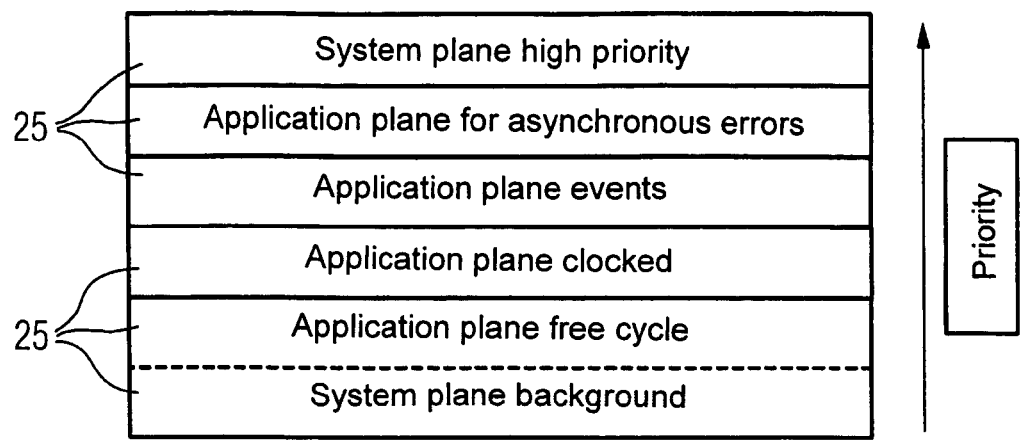
FIG. 5 shows execution planes of a traditional stored-program control system.

FIG. 5 shows the main execution planes of a traditional stored-program control, arranged according to their priority, as indicated by an arrow. In the execution plane 25 with the lowest priority, two different tasks are performed in a round-robin mode, as indicated by the dashed line, namely a free cycle, i.e., "Application Plane Free Cycle" and a background system plane, i.e., "System Plane Background." The background system plane performs, for example, communication tasks. In a subsequent clocked application plane 25, referred to as "Application Plane Clocked", the call instruction cycle of the tasks or programs in this plane can be parameterized. Execution of an application program in this clocked plane is monitored to determine if the execution has terminated, before the next start event occurs. If the clock cycle terminates without terminating execution of the application program in the corresponding plane, then a corresponding task of an "Application Plane for Asynchronous Errors", which has a priority two levels higher, is started, where the user can program how to deal with error states. The application program is implemented as software provided for both the controller and the closed-loop controller.

The application plane above the "Application Plane Clocked" is an "Application Plane Events." A reaction to external or internal events ("Events"), such as exceeding a limit value, occurs within the "Application Plane Events." Tasks of the operating system that manage the operation of the stored-program control reside in a "System Plane High-Priority."

Figure 6:
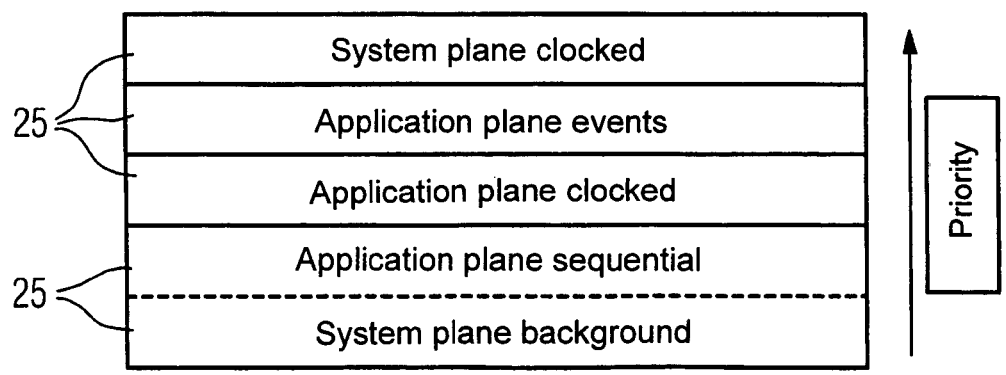
FIG. 6 shows execution planes for controlling a movement of the machine-tool or production machine.

The diagram of FIG. 6 shows the important execution planes 25 for controlling the movement of, for example, a numerical controller (NC) or a computer-controlled NC (CNC). The individual planes are hierarchically organized according to their priority, as indicated by an arrow. A "System Plane Background" and a "Application Plane Sequential" have the same priority, i.e., the lowest priority. This task-related association is indicated in FIG. 5 by a dotted line. The task "Application Plane Sequential" is executed together with the task "System Plane Background" in a round-robin process. Typical tasks of the "System Plane Background" include, for example, communication. The program sections programmed by the user for the actual control tasks are executed in the "Application plane Sequential." If the control system encounters a movement or positioning command in one of these program sections, then a Suspend command is set, i.e., the application program is interrupted at that point. The movement or positioning command is processed in the highest priority "System Plane Clocked." Each position control device running in the "System Plane Clocked" executes the movement and/or positioning command. After execution of this command, the process jumps back into the "Application plane Sequential", and the user program, which had been interrupted by the Suspend command, is resumed at the same location. The "System Plane Clocked" includes in addition to the already mentioned position control devices also an interpolation section of the controller.

Execution planes of a stored-memory controller or a movement controller can be combined in an integrated control-motion system.

Advantageously, the macros, for example the macros depicted in FIGS. 2 to 4, can be associated with an execution plane and executed in that execution plane.

In another advantageous embodiment, instructions according to FIG. 3, such as a control instruction or an association instruction, can be associated with and/or executed in one or several execution planes.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A controller for a machine tool or production machine, comprising:

a parameterizable computer having a software program that is not executable in real-time and a default parameter file with default parameter values, the default parameter file containing no information about an actual machine configuration, the default parameters provided to the controller during an initial start-up of the machine for a safe initial start-up;

an interpreter implemented in the non-real-time software program and executing an executable macro provided to a user for user selection or automatically application-specific selected;

the interpreter determining based on the executed macro parameters for parameterizing the controller, with the default parameters values being overwritten by the parameters determined by the interpreter from the executed macros, so that correct parameter values corresponding to the actual machine configuration are available in the default parameter file during a subsequent start-up of the machine.

2. The controller of claim 1, wherein the macro comprises control instructions.

3. The controller of claim 1, wherein the macro is programmed in a high-level language.

4. The controller of claim 3, wherein the high-level language is selected from the group consisting of XML, HTML and ACX.

5. The controller of claim 1, wherein the macro is reloaded or executed at an arbitrary point in time.

6. The controller of claim 1, wherein the macro prompts a user to enter data.

7. The controller of claim 1, wherein the computer comprises an embedded computer.

8. The controller of claim 1, further comprising a closed-loop controller that controls a drive of the machine tool or production machine.

9. The controller of claim 1, wherein a user selects and programs the macro.

10. The controller of claim 1, wherein the macro includes at least one instruction associated with an execution plane of the controller.

11. A machine-tool or production machine with a controller according to claim 1.

12. A method for parameterizing or programming a controller of a machine tool or production machine, the controller comprising a parameterizable computer having a software program that is not executable in real-time and a default parameter file with default parameter values, the default parameter file containing no information about an actual machine configuration, the method comprising the steps of:

providing the default parameters to the controller during an initial start-up of the machine for a safe initial start-up;

loading an executable macro, which is provided to a user for user selection or is automatically application-specific selected, into an interpreter implemented in the non-real-time software program;

determining with the interpreter parameters for parameterizing the controller based on the executed macro;

overwriting the default parameters values with the parameters determined by the interpreter from the executed macros; and subsequently starting the machine with the correct parameter values corresponding to the actual machine configuration stored in the default parameter file.

13. The method of claim 12, wherein the macro is programmed in a high-level language.

14. The method of claim 12, wherein the macro is reloaded or executed at an arbitrary point in time.

15. The method of claim 12, wherein the macro prompts a user to enter data.

16. The method of claim 12, wherein the macro includes at least one instruction that is automatically associated with an execution plane of the controller.

* * * * *

UNITED STATES PATENT AND TRADEMARK OFFICE
CERTIFICATE OF CORRECTION

PATENT NO. : 7,574,267 B2
APPLICATION NO. : 11/018425
DATED : August 11, 2009
INVENTOR(S) : Armin Feuerbach et al.

It is certified that error appears in the above-identified patent and that said Letters Patent is hereby corrected as shown below:

Title Page;

[73] Assignee: replace "M ä nchen" with the correct --München--.

Signed and Sealed this

Thirteenth Day of October, 2009

David J. Kappos
*Director of the United States Patent and Trademark Office*